(12) United States Patent
Shamis et al.

(10) Patent No.: US 9,792,248 B2
(45) Date of Patent: Oct. 17, 2017

(54) FAST READ/WRITE BETWEEN NETWORKED COMPUTERS VIA RDMA-BASED RPC REQUESTS

(71) Applicant: Microsoft Technology Licensing, LLC, Redmond, WA (US)

(72) Inventors: Alexander Shamis, Seattle, WA (US); Yutaka Suzue, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 14/728,745

(22) Filed: Jun. 2, 2015

(65) Prior Publication Data

US 2016/0357702 A1    Dec. 8, 2016

(51) Int. Cl.
*G06F 15/167* (2006.01)
*G06F 15/173* (2006.01)
(Continued)

(52) U.S. Cl.
CPC ............ *G06F 15/167* (2013.01); *G06F 9/547* (2013.01); *G06F 15/17331* (2013.01); *H04L 12/06* (2013.01); *H04L 67/40* (2013.01)

(58) Field of Classification Search
CPC ... H04L 67/109; G06F 3/06; G06F 17/30194; G06F 17/30203; G06F 9/45558; G06F 17/30091
See application file for complete search history.

(56) References Cited

U.S. PATENT DOCUMENTS 6,360,220 B1    3/2002    Forin
6,697,878 B1    2/2004    Imai
(Continued)

OTHER PUBLICATIONS

"International Search Report and Written Opinion Issued in PCT Application No. PCT/US2016/034208", dated Aug. 5, 2016, 10 Pages.
(Continued)

*Primary Examiner* — Peling Shaw
(74) *Attorney, Agent, or Firm* — Lyon & Harr, LLP; Mark A. Watson

(57) ABSTRACT

An "RDMA-Based RPC Request System" combines the concepts of RPC and RDMA in a way that can be implemented on commodity networking communications hardware, e.g., RDMA-enabled network interface controllers (NICs) in an Ethernet-based network. In various implementations, the RDMA-Based RPC Request System enables fast lock-free and thread-safe execution of RPC requests between different computers in a network via RDMA-based messages. In other words, the RDMA-Based RPC Request System combines RDMA messaging and RPC requests to enable fast RPC requests via a sequence of RDMA messages transmitted over Ethernet using commodity NICs between networked computers in a data center or other network environment. This RDMA message process is both lock-free and thread-safe. Advantageously, being both lock-free and thread-safe improves overall performance of memory access and RPC requests between networked computers by reducing overall system latency for transmission and execution of RPC requests over commodity networking hardware.

20 Claims, 5 Drawing Sheets

Data Center or Other Network of Multiple Servers Communicating via any Combination of Switches, Routers and Direct Connections

(51) Int. Cl.
*G06F 9/54* (2006.01)
*H04L 12/06* (2006.01)
*H04L 29/06* (2006.01)

(56) References Cited

U.S. PATENT DOCUMENTS

| | | | |
|---|---|---|---|
| 7,403,945 B2 | 7/2008 | Lin et al. | |
| 7,565,454 B2 | 7/2009 | Zuberi | |
| 7,610,348 B2 | 10/2009 | Kisley et al. | |
| 7,617,290 B1 | 11/2009 | Cheriton et al. | |
| 7,617,370 B2 | 11/2009 | Jernigan, IV et al. | |
| 7,702,743 B1 | 4/2010 | Wong | |
| 7,756,943 B1 | 7/2010 | Wong | |
| 7,761,619 B2 | 7/2010 | Feng et al. | |
| 7,917,597 B1 | 3/2011 | Lentini | |
| 8,155,135 B2 | 4/2012 | Aloni et al. | |
| 8,205,015 B2 | 6/2012 | Flynn et al. | |
| 8,271,996 B1 | 9/2012 | Gould et al. | |
| 8,407,428 B2 | 3/2013 | Cheriton et al. | |
| 8,578,127 B2 | 11/2013 | Thatcher et al. | |
| 8,676,851 B1 | 3/2014 | Nesbit et al. | |
| 8,688,798 B1 | 4/2014 | Lentini | |
| 8,972,627 B2 | 3/2015 | Strasser et al. | |
| 9,058,122 B1 | 6/2015 | Nesbit et al. | |
| 2003/0145230 A1 | 7/2003 | Chiu et al. | |
| 2004/0225719 A1* | 11/2004 | Kisley | G06F 3/061 709/212 |
| 2012/0124282 A1* | 5/2012 | Frank | G06F 3/061 711/108 |
| 2012/0198284 A1 | 8/2012 | Li | |
| 2013/0054726 A1* | 2/2013 | Bugge | G06F 9/52 709/212 |
| 2013/0086183 A1 | 4/2013 | Frank et al. | |
| 2014/0089346 A1* | 3/2014 | Li | G06F 17/30215 707/781 |
| 2014/0143368 A1 | 5/2014 | Anderson | |
| 2014/0317336 A1 | 10/2014 | Fitch et al. | |
| 2014/0325012 A1 | 10/2014 | Guerin et al. | |
| 2014/0359044 A1 | 12/2014 | Davis et al. | |
| 2014/0359145 A1 | 12/2014 | Metzler et al. | |
| 2014/0359146 A1 | 12/2014 | Metzler et al. | |
| 2015/0067086 A1 | 3/2015 | Adriaens et al. | |
| 2015/0186051 A1 | 7/2015 | Gurajada | |
| 2016/0182433 A1* | 6/2016 | McDaid | H04L 65/4015 709/206 |
| 2016/0308968 A1* | 10/2016 | Friedman | H04L 67/2842 |

OTHER PUBLICATIONS

Choi, et al., "A Remote Memory System for High Performance Data Processing", In International Journal of Future Computer and Communication, vol. 4, No. 1, Feb. 2015, pp. 50-54.
Bays, Carter, "A Comparison of Next-Fit, First-Fit, and Best-Fit", In Magazine of Communications of the ACM, vol. 20, Issue 3, Mar. 1977, pp. 191-192.
Tanenbaum, Andrew S., "Modern Operating Systems", In Proceedings of Prentice Hall, Dec. 21, 2007, 552 pages.
"Memory Pool", Retrieved on: Mar. 29, 2015 Available at: http://en.wikipedia.org/wiki/Memory_pool.
Ongaro, et al., "Fast Crash Recovery in RAMCloud", In Proceedings of the Twenty-Third ACM Symposium on Operating Systems Principles, Oct. 23, 2011, pp. 29-41.
Ousterhout, et al., "The Case for RAMClouds: Scalable High-Performance Storage Entirely in DRAM", In Proceedings of ACM SIGOPS Operating Systems Review, vol. 43, Issue 4, Dec. 2009, pp. 1-14.
Dragojevic, et al., "FaRM: Fast Remote Memory", In Proceedings of 11th USENIX Symposium on Networked Systems Design and Implementation, Apr. 2, 2014, 15 pages.
MacKall, Matt, "SLOB Allocator: Simple List of Blocks", Published on: Mar. 30, 2012 Available at: http://staff.osuosl.org/~bkero/slob.c.
Bonwick, Jeff, "The Slab Allocator: An Object-Caching Kernel Memory Allocator", In Proceedings of the USENIX Summer Technical Conference, vol. 1, Jun. 6, 1994, 18 pages.
"The SLUB allocator", Published on: Apr. 11, 2007 Available at: http://lwn.net/Articles/229984/.
Stuedi, et al., "jVerbs: Ultra-Low Latency for Data Center Applications", In Proceedings of ACM Symposium on Cloud Computing, Oct. 1, 2013, 14 pages.
Szepesi, et al., "Designing a Low-Latency Cuckoo Hash Table for Write-Intensive Workloads Using RDMA", Retrieved on: Mar. 26, 2015 Available at: https://cs.uwaterloo.ca/~bernard/nessie.pdf.
Noronha, et al., "Designing NFS with RDMA for Security, Performance and Scalability", In Proceedings of International Conference on Parallel Processing, Sep. 10, 2007, 8 pages.
Noureddine, Wael, "NFS/RDMA over 40Gbps iWARP", Retrieved on: Mar. 26, 2015 Available at: http://www.chelsio.com/wp-content/uploads/resources/SDC2014_Chelsio_NFSoRDMA.pdf.
Kalia, et al., "Using RDMA Efficiently for Key-Value Services", In Proceedings of ACM Conference on SIGCOMM, Aug. 17, 2014, pp. 295-306.
Behringer, Benjamin, "Memory Management for Concurrent RDMA: A Design for a Key-Value Store", In Thesis, Jun. 3, 2014, 87 pages.
Michael, Maged M., "Scalable Lock-Free Dynamic Memory Allocation", In Proceedings of ACM SIGPLAN Conference on Programming Language Design and Implementation, Jun. 9, 2004, pp. 1-12.
International Search Report and Written Opinion Issued in PCT Application No. PCT/US2016/061497, dated Feb. 2, 2017, 10 pages.
Bonwick et al., Magazines and Vmem: Extending the Slab Allocator to many CPU's and arbitrary resources, Proc. of the 2001 USENIX Annual Technical Conference, Jun. 25-30, 2001, pp. 1-20.
International Search Report and Written Opinion Issued in PCT Application No. PCT/US2016/056224, dated Feb. 3, 2017, 11 pages.
Aguilera, et al., A practical scalable distributed B-tree, Proceedings of the VLBD Endowment, vol. 1, No. 1, Aug. 1, 2008, pp. 1-12.
Dragojevic, et al., No compromises, Operating System Principles, ACM, Oct. 4, 2015, pp. 54-70.
Mitchell, et al., Building fast, CPU-efficient distributed systems on ultra-low latency, RDMA-capable networks, Ph.D Dissertation, Sep. 2015, pp. 1-110.

\* cited by examiner

FAST READ/WRITE BETWEEN NETWORKED COMPUTERS VIA RDMA-BASED RPC REQUESTS

BACKGROUND

In general, direct memory access (DMA) provides various techniques that enable a device or process of a local host computing device to directly read and write local memory of that host device without interrupting the host's CPU(s). In contrast, remote direct memory access (RDMA), which is increasingly being deployed in data centers, extends traditional DMA-based techniques to enable a remote device or process to directly read and write memory of a remote computing device without interrupting the CPU(s) of the remote computing device.

Existing RDMA-based techniques, such as, for example, InfiniBand, iWARP, RDMA over Converged Ethernet (RoCE), etc., make use of RDMA-enabled network interface controller (NICs). When writing data across an RDMA-enabled network, servers or other computing devices equipped with an RDMA-enabled NIC typically apply DMA to read data in a user- or process-specified buffer or memory address and transmit that data as a self-contained message to an RDMA-enabled NIC of networked computing device. The receiving RDMA-enabled NIC then uses DMA to write that data into a user- or process-specified buffer or memory address. Similarly, for data reads across RDMA-enabled networks, the local computing device uses the RDMA-enabled NIC to transmit a self-contained message to an RDMA-enabled NIC of the remote computing device to request data from a user- or process-specified buffer or memory address. The remote computing device then applies DMA to read the requested data and return it to the local computing device via the RDMA-enabled NICs of each device.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, an "RDMA-Based RPC Request System," as described herein, combines remote direct memory access (RDMA) messaging and remote procedure call (RPC) requests to provide fast RPC requests via a sequence of RDMA messages transmitted between networked computers. The process by which these RDMA messages are transmitted allows the overall RDMA-Based RPC Request System to be both lock-free and thread-safe.

For example, in various implementations, the RDMA-Based RPC Request System receives a request from a process executing on a sender computing device (also referred to as a client) to send an RPC request to a particular receiver computing device (also referred to as a server). A request for receiver control data is then transmitted from the sender to the receiver via an RDMA read message.

In various implementations, the receiver control data comprises a list of free slots of an RDMA message buffer of the receiver. In further implementations, this receiver control data also includes, but is not limited to, a total number of RPC requests active on the receiver. In various implementations, the total number of RPC requests is used to control a maximum number of concurrent messages that can be sent to any particular receiver. This ensures that the RDMA message buffer is not filled too quickly in order to avoid potential race conditions or buffer overflow resulting from too many active requests sent to the RDMA buffer from one or more senders. In other words, if the current number of RPC requests active on the receiver exceeds some maximum number (corresponding to RDMA message buffer size), the sender will not send additional RPC requests to that receiver until such time as there are fewer active requests on that receiver.

In response to receipt of the requested control data by the sender, the sender performs a lock-free reservation by transmitting a reservation request for one of the free slots to the receiver via an RDMA atomic compare and swap message. In various implementations, this reservation request may be repeated (with other free slots) until successful in the event that other processes or clients are successful in reserving the requested free slot prior to the sender. The sender then directly writes the RPC request to the reserved slot of the receiver via an RDMA write message.

Following execution of the RPC request, the receiver provides the results of the executed RPC request to the sender by applying techniques similar to the initial request of the sender. In particular, in various implementations, following the execution of the RPC request by the receiver, a request for sender control data is transmitted from the receiver to the sender via an RDMA read message.

Similar to the receiver control data, in various implementations, the sender control data comprises a list of free slots of an RDMA message buffer of the sender. In further implementations, this sender control data also includes, but is not limited to, a total number of RPC requests active on the sender. As with the receiver, in various implementations, the total number of RPC requests active on the sender is used to control a maximum number of concurrent messages that can be sent to any particular sender. This ensures that the RDMA message buffer of the sender is not filled too quickly in order to avoid potential race conditions or buffer overflow resulting from too many active requests sent to the sender RDMA buffer from one or more receivers. In other words, if the current number of RPC requests active on the sender exceeds some maximum number (corresponding to RDMA message buffer size), the receiver will not send additional RPC requests to that sender until such time as there are fewer active requests on that sender.

In response to receipt of the requested control data by the receiver, the receiver performs a lock-free reservation by transmitting a reservation request for one of the free slots to the sender via an RDMA atomic compare and swap message. In various implementations, this reservation request may be repeated until successful in the event that other processes or clients are successful in reserving the sender's requested free slot prior to the receiver. The receiver then directly writes the results of the original RPC request of the sender to the reserved slot of the sender via an RDMA write message.

In addition to providing lock-free slot reservations, the above-summarized process is thread-safe. In other words, the RDMA-Based RPC Request System provides memory access techniques that are guaranteed to be free of race conditions when accessed by simultaneous multiple threads from any number of computing devices. Significantly, being both lock-free and thread-safe improves overall performance of memory access between computers in data centers and other networks by reducing overall system latency for transmission and execution of RPC requests over commodity NIC hardware, e.g., RDMA-enabled network interface controllers (NICs) in an Ethernet network.

The RDMA-Based RPC Request System described herein provides various techniques for enabling fast RPC requests via a sequence of RDMA messages transmitted using commodity NICs between networked computers in a data center or other network environment. The process by which these RDMA messages are transmitted allows the overall RDMA-Based RPC Request System to be both lock-free and thread-safe. In addition to the benefits described above, other advantages of the RDMA-Based RPC Request System will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
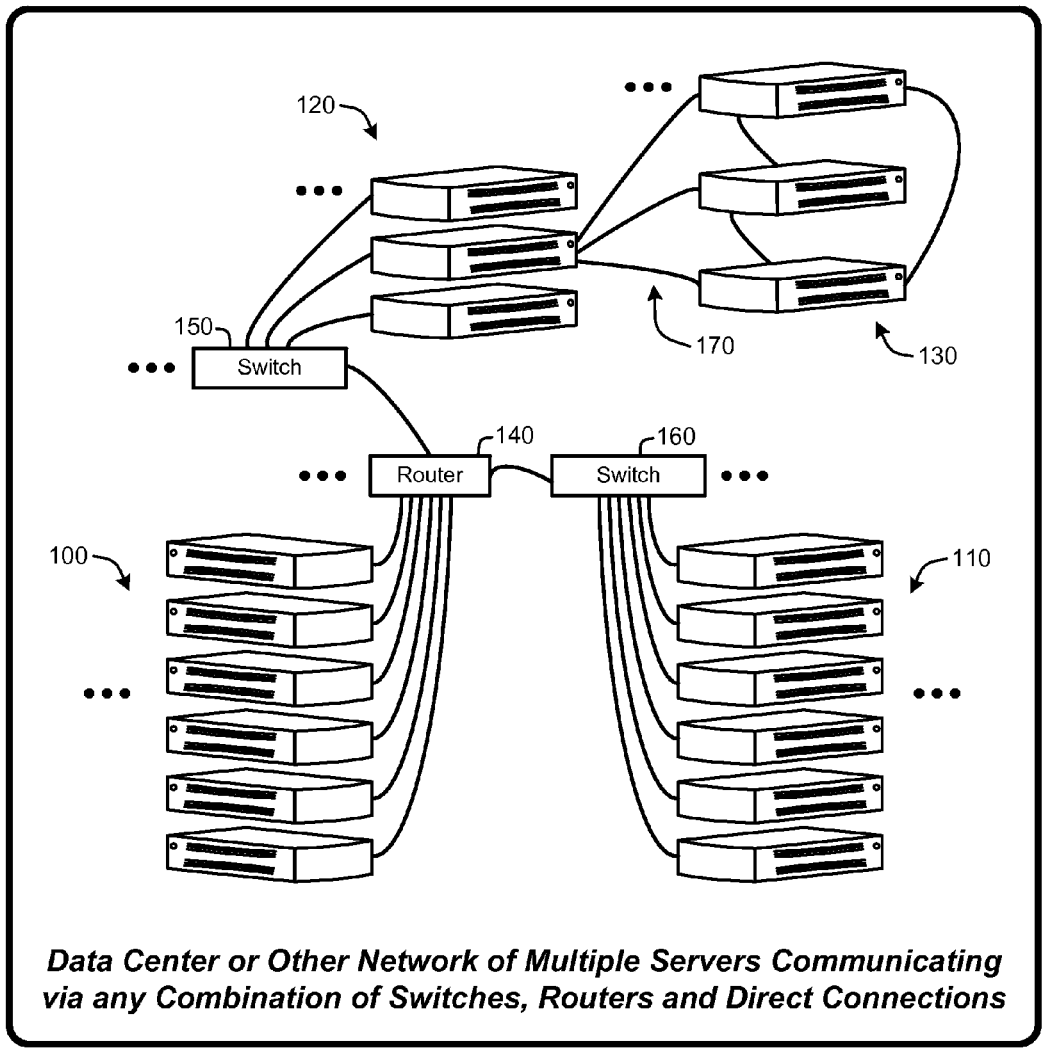
FIG. 1 illustrates an exemplary data center or other network of multiple servers communicating via any combination of RDMA-enabled switches, routers and direct connections for use with an "RDMA-Based RPC Request System," as described herein.

In the following description of various implementations of a "RDMA-Based RPC Request System," reference is made to the accompanying drawings, which form a part hereof, and in which is shown by way of illustration specific implementations in which the RDMA-Based RPC Request System may be practiced. Other implementations may be utilized and structural changes may be made without departing from the scope thereof.

Specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the RDMA-Based RPC Request System. Further, the appearance of such phrases throughout the specification are not necessarily all referring to the same implementation, and separate or alternative implementations are not mutually exclusive of other implementations. The order described or illustrated herein for any process flows representing one or more implementations of the RDMA-Based RPC Request System does not inherently indicate any requirement for the processes to be implemented in the order described or illustrated, and any such order described or illustrated herein for any process flows do not imply any limitations of the RDMA-Based RPC Request System.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server itself can be a component. One or more components can reside within a process and a component can be localized on one computer and/or distributed between two or more computers. Further, in the context of the RDMA-Based RPC Request System, any of a plurality of networked servers may concurrently or separately act as either or both sender computing devices and receiver computing devices. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In general, a remote procedure call (RPC) is an inter-process communication that allows a computer program, process, or thread running on one computer to cause a subroutine or procedure to execute in an address space of a different computer on a shared network. Typically, to execute an RPC, a client computer sends an RPC request to a server computer. The RPC request includes an ID of a particular procedure (e.g., a subroutine, application, process, etc.) to be executed by the server and one or more optional parameters to be used for execution of that procedure. In various implementations, a "cookie" or the like may also be sent along with the ID. In general, this cookie is an identifier (e.g., number, name, etc.) that uniquely identifies the sender in a way that enables the original message sent by the sender to be matched to the response that is eventually received by the sender.

Further, remote direct memory access (RDMA) is a direct memory access from the memory of one computer into the memory of a different computer that is performed via the RDMA-enabled network interface controllers (NICs) of those computers without involving the operating system of either computer. In other words, all of the RDMA operations are performed directly by the NICs reading and writing to server memory without any interruption or notification to the CPU of either server. The CPU of a server only gets involved when it executes the procedure specified by the RPC request, or possibly in reaction to a response to an RPC request received from another server.

An "RDMA-Based RPC Request System," as described herein, combines the concepts of RPC and RDMA in a way that can be implemented on commodity network hardware, e.g., RDMA-enabled network interface controllers (NICs) in an Ethernet-based network. In various implementations, the RDMA-Based RPC Request System enables fast lock-free and thread-safe execution of RPC requests between different computers in a network via a sequence of RDMA-based messages over commodity NICs. In other words, the RDMA-Based RPC Request System combines RDMA messaging and RPC requests to provide fast RPC requests via a sequence RDMA messages transmitted between computers in a data center or other network environment. These RPC requests may be directed to any available procedure and may include any number of optional parameters.

Advantageously, being both lock-free and thread-safe improves overall performance of RPC requests and memory access between networked computers by reducing overall system latency for transmission and execution of RPC requests over commodity NIC hardware. Further, the ability of the messaging techniques described herein to use commodity NICs reduces networking costs relative to networks based on specialized NIC hardware. In addition, networks implemented using the RDMA-Based RPC Request System are very flexible in that any server acting as a sender with respect to one or more other receivers may concurrently be acting as a receiver with respect to one or more other senders. Further, the RDMA-Based RPC Request System is easily scalable to multiple simultaneous, concurrent, or sequential requests from servers acting in either or both a sender and a receiver capacity, thereby improving network performance.

As illustrated by FIG. 1, the RDMA-Based RPC Request System may be configured for use with any desired network configuration including any combination of servers (100, 110, 120 and 130) communicating via any combination of RDMA-enabled routers 140, switches (150 and 160), and direct connections 170. Advantageously, the communications and messaging techniques enabled by the RDMA-Based RPC Request System is scalable to any number of networked computers and any number of concurrent RPC requests between any number of the networked computers.

Figure 2:
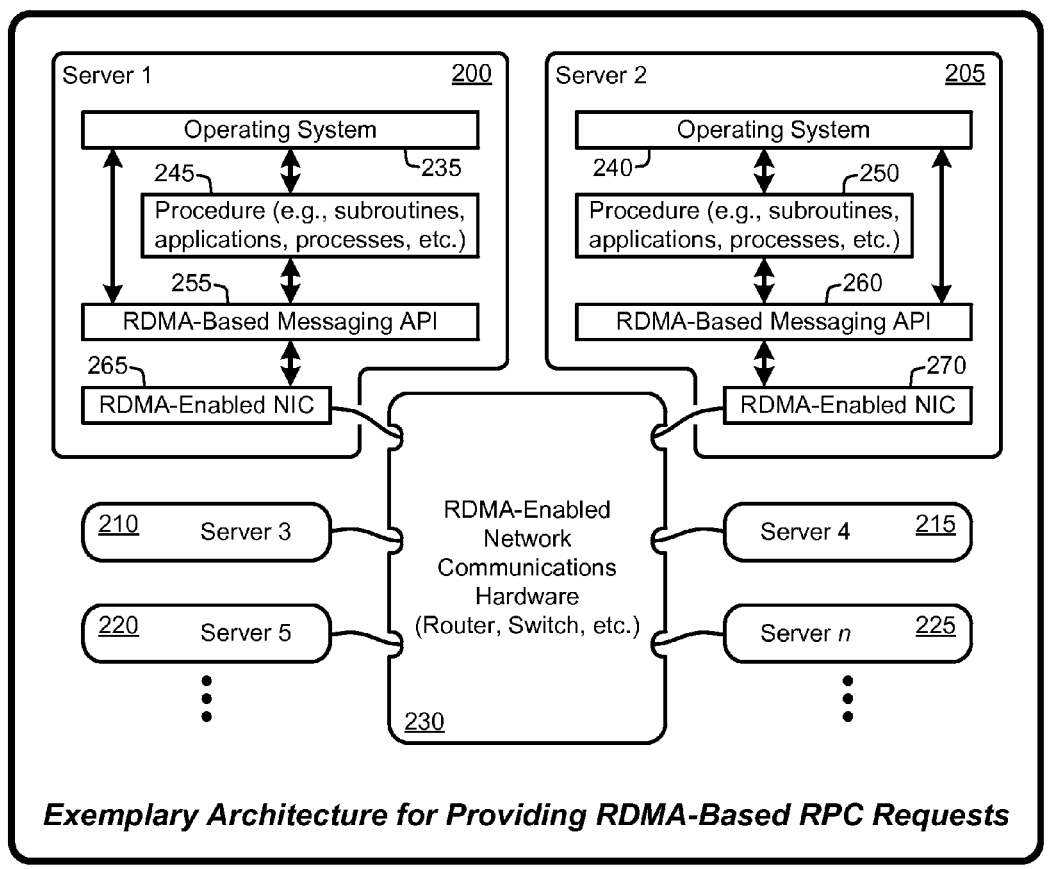
FIG. 2 illustrates a general architectural diagram for providing RDMA-based RPC requests using the RDMA-Based RPC Request System, as described herein.

FIG. 2 illustrates an exemplary architecture of the RDMA-Based RPC Request System. In particular, a plurality of servers (200, 205, 210, 215, 220, and 225) are configured as a network via RDMA-enabled network communications hardware 230 such as a router, switch, or other networking hardware. Each of the servers (200, 205, 210, 215, 220, and 225) may operate as either or both a sender and a receiver with respect to any of the other servers in the network. Further, in various implementations, each of the servers (200, 205, 210, 215, 220, and 225) is configured to run an operating system (e.g., 235, 240), which in turn may execute one or more procedures (e.g., 245, 250). An RDMA-based messaging API (255, 260) resides on each server (200, 205, 210, 215, 220, and 225), and is applied to intercept and handle any RPC requests from any procedure (e.g., 245, 250) or the operating system (e.g., 235, 240) executing on each particular server. The RDMA-based messaging API is also referred to herein as either a messaging API module, or simply an API. Finally, each of the servers (200, 205, 210, 215, 220, and 225) includes an RDMA-enabled NIC (e.g., 265, 270) that is used to send and receive RDMA messages to and from the RDMA-enabled NICs of one or more of the other servers, as described herein.

Figure 3:
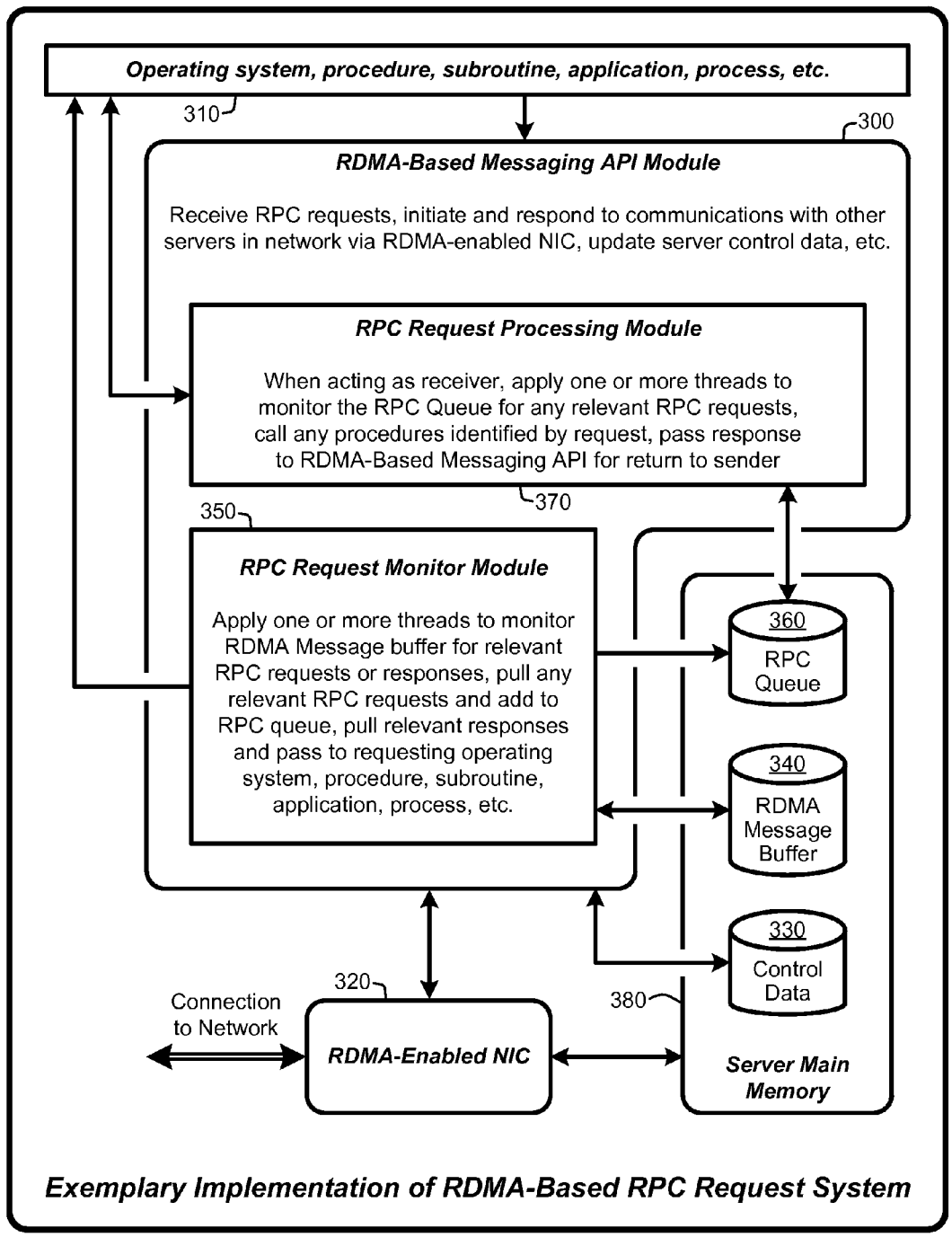
FIG. 3 provides an exemplary flow diagram that illustrates program modules for effecting various implementations of the RDMA-Based RPC Request System, as described herein.

1.1 System Overview:

As mentioned above, the RDMA-Based RPC Request System provides various techniques for enabling fast RPC requests via a sequence of RDMA messages transmitted using commodity NICs between networked computers in a data center or other network environment to provide an overall system that is both lock-free and thread-safe. The processes summarized above are illustrated by the general system diagram of FIG. 3. In particular, the system diagram of FIG. 3 illustrates the interrelationships between program modules for implementing various implementations of the RDMA-Based RPC Request System, as described herein. Furthermore, while the system diagram of FIG. 3 illustrates a high-level view of various implementations of the RDMA-Based RPC Request System, FIG. 3 is not intended to provide an exhaustive or complete illustration of every possible implementation of the RDMA-Based RPC Request System as described throughout this document.

In addition, any boxes and interconnections between boxes that may be represented by broken or dashed lines in FIG. 3 represent alternate implementations of the RDMA-Based RPC Request System described herein. Further, any or all of these alternate implementations, as described below, may be used in combination with other alternate implementations that are described throughout this document.

In general, as illustrated by FIG. 3, the processes enabled by the RDMA-Based RPC Request System begin operation by applying an RDMA-Based Messaging API Module 300 to perform various functions, including, but not limited to receiving RPC requests from an operating system, procedure, subroutine, application, process, etc. (310), initiating and responding to communications with other servers in network via an RDMA-enabled NIC 320, updating server control data 330, etc.

In addition, an RPC Request Monitor Module 350 of the RDMA-Based Messaging API Module 300 applies one or more threads to monitor an RDMA Message Buffer 340 for relevant RPC requests or responses. The threads of the RPC Request Monitor Module 350 pull relevant RPC requests RDMA Message Buffer 340 and adds those requests to an RPC Queue 360. In addition, the threads of the RPC Request Monitor Module 350 pull relevant responses RDMA Message Buffer 340 and pass those responses to the requesting operating system, procedure, subroutine, application, process, etc. (310) that initiated the RPC request on that server. In various implementations, one or more blocks of server main memory 380 are reserved to host the control data 330, the RDMA Message Buffer 340, and the RPC queue, such that the reserved memory is only accessed by the RDMA-Based Messaging API Module 300 and via DMA read/write calls to that memory by the NIC. In other words, no other processes executing on the host server other than the RDMA-Based Messaging API Module 300 or the NIC of the host server writes to reserved server main memory 380.

Further, an RPC Request Processing Module 370 is applied in the case that a particular server is acting as a receiver to apply one or more threads to monitor the RPC Queue 360 for relevant RPC requests. When any of thread identifies a relevant RPC request, that thread calls the procedure identified by RPC request and when that procedure has completed execution, the RPC Request Processing Module 370 passes the response to that RPC request to the RDMA-Based Messaging API 300 for return to the sender server via the RDMA-Enabled NIC 320.

2.0 Operational Details of the RDMA-Based RPC Request System:

The above-described program modules are employed for implementing various implementations of the RDMA-Based RPC Request System. As summarized above, the RDMA-Based RPC Request System provides various techniques for enabling fast RPC requests via a sequence of RDMA messages transmitted using commodity NICs between networked computers in a data center or other network environment to provide an overall system that is both lock-free and thread-safe. The following sections provide a detailed discussion of the operation of various implementations of the RDMA-Based RPC Request System, and of exemplary methods for implementing the program modules described in Section 1 with respect to FIG. 1. In particular, the following sections provides examples and operational details of various implementations of the RDMA-Based RPC Request System, including:

An operational overview of the RDMA-Based RPC Request System;
RDMA verbs;
Server control data;
Reservation requests; and
RDMA message buffer and RPC queue.

2.1 Operational Overview:

As noted above, the RDMA-Based RPC Request System-based processes described herein provides various techniques for enabling fast RPC requests via a sequence of RDMA messages transmitted using commodity NICs between networked computers in a data center or other network environment having any number of servers. In various implementations, this messaging capability is enabled by a connection library or the like that provides an application programming interface (API) for use of RDMA-based messaging via the RDMA-enabled NICs of each server. This connection library, referred to herein as the RDMA-based messaging API, encapsulates various protocols to both establish and maintain connections between the NICs of any number of networked computers. In general, the RDMA-based messaging API is implemented based on "kernel bypass" techniques.

Kernel bypass is a concept that is applied to improve network performance by carrying out various operations and memory reads and writes without access or notification to the kernel. In a typical networking scenario, the kernel decodes network packets, e.g., TCP, and passes the data from the kernel space to "user space" by copying it. The term "user space" refers to code which runs outside the kernel (e.g., outside kernel space). User space typically refers to various programs and libraries that the OS uses to interact with the kernel, such as, for example, software that performs input/output, manipulates file system objects, application software etc. The copy process from kernel space to user space typically involves saving user space process context data and then loading kernel context data. This step of saving the user space process context data and then loading the kernel process information is typically referred to as context switch. However, application context switching has been observed to constitute a large fraction of network overhead, thereby reducing bandwidth and latency performance of computer interconnects.

The RDMA-Based RPC Request System adapts various kernel bypass techniques to enable various user space applications to communicate with the aforementioned RDMA-based messaging API, which is adapted to communicate both with user space applications and the NIC on which the RDMA-based messaging API is executing. This process takes the kernel out of the path of communication between the user space process and an I/O subsystem enabled by the RDMA-based messaging API that handles network communication via the RDMA enabled NICs. Advantageously, this configuration eliminates context switching and the copy from kernel space to user space. For example, in various implementations, the RDMA-Based RPC Request System generally transmits RDMA read/write/CAS messages via the following order of user space operations:

1. Make a determination on a local server that an RDMA message is to be transmitted to a remote server;
2. Call the RDMA-based messaging API of the local server;
3. Apply the RDMA-based messaging API to communicate with the NIC of the local server; and
4. Apply the NIC of the local server to communicate with physical networking hardware (e.g., RDMA-enabled switches, routers, etc.) of the network to send the RDMA message across the network from the local server to the remote server.

In various implementations, the library implemented by the RDMA-based messaging API provides a fast (lock-free and thread-safe) RPC service based on combinations of RDMA verbs that include RDMA write messages, RDMA read messages, and RDMA atomic compare and swap (CAS) messages. Any application or process running on any server may access the API to initiate RPC requests. The API will then automatically initiate communication between servers to process the RPC request.

For example, in various implementations, an application, process, or thread executing on one of the networked servers acting as a "sender" first instructs that sender to send an RPC request to a particular networked server acting as a "receiver." Once the sender has received instructions to send an RPC request to the particular receiver, the RDMA-based messaging API causes the NIC of the sender to transmit a request, via an RDMA read message, to the NIC of the receiver to obtain that receiver's "control data," which includes a list of free slots of an RDMA message buffer of the receiver, and, optionally, additional information such as a number of active RPC requests pending on the receiver.

In various implementations, the total number of RPC requests is optionally used to control a maximum number of concurrent messages that can be sent to any particular receiver. This ensures that that the RDMA message buffer is not filled too quickly in order to avoid potential race conditions or buffer overflow resulting from too many active requests sent to the RDMA buffer from one or more senders. In other words, if the current number of RPC requests active on the receiver exceeds some maximum number (corresponding to RDMA message buffer size), the sender will not send additional RPC requests to that receiver until such time as there are fewer active requests on that receiver.

Following successful transmission of the RDMA read message requesting control data to the NIC of the receiver, the NIC of the receiver automatically responds to the NIC of the sender with the requested control data. The RDMA-based messaging API then causes the sender to reserve one of the free slots indicated in the control data by causing the NIC of the sender to issue an RDMA CAS message to the NIC of the receiver requesting a selected one of the free slots.

Following a successful reservation of a free slot of the RDMA message buffer of the receiver, the RDMA-based messaging API causes the NIC of the sender to write the RPC request to the reserved slot of the receiver via an RDMA write message. Then, following execution of the processes specified by the RPC request, the results of that RPC request are returned to the sender using a process similar that used by the sender to set up and transmit the RPC request to the receiver.

For example, following execution of the RPC request on the receiver, the receiver applies a local copy of the RDMA-based messaging API to cause the NIC of the receiver to transmit an RDMA read message to the NIC of the sender to request the sender control data. Following successful transmission of the RDMA read message requesting control data to the NIC of the sender, the NIC of the sender automatically responds to the NIC of the receiver with the requested control data, which includes free slots of the senders RDMA message buffer and may also include other information such as a total number of RPC requests active on that sender.

As with the receiver, in various implementations, the total number of RPC requests active on the sender is optionally used to control a maximum number of concurrent messages that can be sent to any particular sender. This ensures that that the RDMA message buffer of the sender is not filled too quickly in order to avoid potential race conditions or buffer overflow resulting from too many active requests sent to the sender RDMA buffer from one or more receivers. In other words, if the current number of RPC requests active on the sender exceeds some maximum number (corresponding to RDMA message buffer size), the receiver will not send additional RPC requests to that sender until such time as there are fewer active requests on that sender.

The RDMA-based messaging API of the receiver then causes the receiver to reserve one of the free slots indicated in the control data by causing the NIC of the receiver to issue an RDMA CAS message to the NIC of the sender. Following a successful reservation of a free slot of the RDMA message buffer of the sender, the RDMA-based messaging API causes the NIC of the receiver to write the result or response of the RPC request to the reserved slot of the sender via an RDMA write message.

2.2 RDMA Verbs:

As noted above, in various implementations, the RDMA-Based RPC Request System adapts a sequence of RDA verbs to enable fast lock-free and thread safe execution of RPC requests between networked computers. The RDMA verbs applied for this purpose include RDMA write messages, RDMA read messages, and RDMA atomic compare and swap (CAS) messages.

RDMA read messages enable the sender to read a section of memory of the receiver via the RDMA NICs of the sender and the receiver. The sender specifies a remote virtual address of the receiver and a local memory address to be copied to. In various implementations, the RDMA-Based RPC Request System assumes a protected network where all servers have appropriate permissions to access the memory of other computers. Otherwise, an additional permission step is performed prior to performing RDMA operations to ensure that the receiver provides appropriate permissions to access its memory. Assuming such permission is in place, RDMA read operations are conducted via messaging between the NICs of the sender and the receiver with no notification whatsoever to the operating system of the receiver. In other words, the RDMA read message enables the sender to read memory of the receiver without the operating system of the receiver being aware of that memory read.

Similarly, RDMA write messages enable the sender to write to a section of memory of the receiver via the RDMA NICs of the sender and the receiver. As with RDMA reads, RDMA write operations are performed with no notification to the receiver.

The RDMA atomic compare and swap (CAS) message is used to atomically compare a value in the RDMA CAS message from the sender to a value of a specified virtual address of the receiver. If the compared values are equal, a value specified by the RDMA CAS message will be stored at the virtual address of the receiver. In other words, in an atomic transaction, a series of database operations either all occur, or nothing occurs. A guarantee of atomicity prevents updates to the memory address occurring only partially. Consequently, the RDMA transaction is not observed to be in progress by the receiver because at one moment in time, it has not yet happened, and at the next moment, it has already occurred in whole (or nothing happened if the transaction failed due to a mismatch of the sent value and the value held by the receiver).

2.3 Server Control Data:

Each server in the network hosts a copy of its own control data in memory that may be accessed by the local instance of the RDMA-based messaging API via user space operations. Further, that memory is reserved for use by the RDMA-based messaging API to ensure that the server, or other processes executing on the server, do not write to reserved memory. Consequently, the NIC of any sender in the network can directly obtain the control data of any receiver via the aforementioned RDMA read message without involving the operating system of either the sender or the receiver. Consequently, in various implementations, the control data of each individual server includes a real-time list of free slots of an RDMA message buffer maintained in main memory of that server. More specifically, as noted above, one or more blocks of server main memory are reserved to host the control data, the RDMA message buffer, and the RPC queue. This reserved memory is then only accessed by the RDMA-based messaging API and via DMA read/write calls to that memory by the NIC of that server.

As noted above, the control data hosted by each server includes a real-time or current list of the free slots of that server's RDMA message buffer. Free slots are those slots of the buffer that are not currently occupied by pending or active RPC requests. In addition, in various implementations, the control data of each individual server further includes a total number of RPC requests active on that server.

By using the same size RDMA message buffer for each server and the same size and number of slots in that buffer, knowledge of the total number of active RPC requests on a receiver corresponds to the number of filled slots in the buffer. This information is also useful for ensuring that incoming messages from one or more senders to a particular receiver do not overwrite pending messages in the RDMA message buffer of that receiver. In other words, as mentioned above, consideration of the total number of RPC requests as a control mechanism for either allowing or preventing sending of additional RDMA messages to any particular ensures that that the RDMA message buffer of that server is not filled too quickly. Advantageously, this feature is useful for both avoiding potential race conditions and for preventing buffer overflow resulting from too many active requests sent to the RDMA buffer of a particular server.

When the response to the RPC call is complete, i.e., when the results of the RPC request have been returned by the receiver to the sender, the thread on the receiver that was running the RPC request marks the corresponding slot of the RDMA message buffer as free in the control data hosted by the receiver.

Advantageously, the use of control data hosted by each server in the network enables the RDMA-Based RPC Request System to scale to very large numbers of networked servers, thereby increasing the efficiency of RPC requests in large data centers and other networks.

2.4 Reservation Requests:

As noted above, a server (acting as either a sender or receiver) will reserve a selected one of the free slots indicated in the control data hosted by another server by causing the NIC of the requesting server to issue an RDMA CAS message to the NIC of the other server to request a selected one of the free slots of that server's RDMA message buffer.

In various implementations, the RDMA-Based RPC Request System simply selects the first free slot in the list and then attempts to reserve that selected slot. However, other slot selection methods may also be implemented. For example, in various limitations, alternate slot selection methods include, but are not limited to, designating particular sections of one or more slots for use by particular servers, random selection from the free slot list, etc. For example, by dividing the buffer into segments or sections and designating those sections to particular servers, the free slot list provided by one server to another may include only those free slots in the section of the buffer designated for use by the particular server. In this case, that server may then select the first free slot in the section of the buffer designated for that server. In the case of random selection, each server attempting to access the RDMA message buffer of any other server makes a random selection from the free slot list. Random selection has been observed to improve performance with respect to possible race scenarios where multiple servers may be trying to reserve the same first free slot.

For example, assuming a sender request to a receiver, the RDMA-based messaging API of the sender causes the sender to request a selected one of the free slots indicated in the control data by causing the NIC of the sender to issue an RDMA CAS message to the NIC of the receiver. This RDMA CAS message includes a value that identifies the requested free slot of the receiver. If the slot is requested slot is still free, the receiver will hold the same value for the requested slot and the CAS operation will be successful because when the compared values are equal, a value specified by the RDMA CAS message will then be stored be stored at the virtual address of the receiver.

For example, in various implementations, a single bit for each slot may be used to indicate whether each particular slot is free (e.g., "0" if the slot is free and "1" if the slot is not free). So, if the RDMA CAS message includes a "0" for a particular slot, and the bit on the receiver for that slot also holds a "0", the CAS message will cause that slot to hold a "1", thereby successfully reserving that slot and preventing that slot from being reserved in response to other requests. Further, when the receiver is finished using that slot (e.g., the RPC request written to that slot by the RDMA write request has been pulled into the RPC queue), the receiver will then mark that slot as free by causing the corresponding bit to hold a "0".

As noted above, the network may contain a large number of servers, any of which may be contacting other servers with RPC requests via the RDMA messaging techniques described herein. As such, any number of processes running on any of the other servers in the network may be concurrently attempting to reserve the same free slot with respect to different RPC requests.

Consequently, it is possible that one of those other processes may have already reserved the free slot being requested via the RDMA CAS message transmitted by the NIC of the sender to the NIC of the receiver. Therefore, in the case that the free slot is filled (and thus no longer free) before receiving the RDMA CAS message of the sender, the CAS operation will fail since the value of the free slot in the CAS message will no longer match the value held by the receiver. In various implementations, if the CAS message fails, the sender will either issue another CAS message requesting one of the other free slots, or it will first issue another RDMA read message to the NIC of the receiver to obtain an updated copy of that receiver's control data followed by another CAS request for one of the free slots of the receiver. This process continues until a slot reservation is successful via an RDMA CAS message.

When a slot reservation is successful, the control data of the server (sender or receiver) on which the slot has been reserved is updated to indicate that the reserved slot is no longer free. As such, no servers other than the successful sender will attempt to write to that slot since they will be unable to obtain a reservation for that slot until it is again marked as free. Further, once a slot reservation by any sender to any receiver is successful, even if a particular requesting server holds outdated control data for the receiver that shows a now reserved slot is free, any RDMA CAS operation sent by the requesting server to the receiver for that slot will simply fail.

The proceeding discussion assumed the use of a single RDMA message buffer and control data that indicated which slots of that single RDMA message buffer were free. However, in various implementations, rather than use a single RDMA message buffer for all incoming connections from other servers, each server may instead host a plurality of separate RDMA message buffers that are each dedicated to a particular connection with a requesting server.

The total number and size of buffers maintained for this purpose may be set to any desired value, with that total number and size corresponding to the total number of connections and active RPC requests from each connection that may be processed by the server at any time. In this case, the control data hosted by each server will include a list of free buffers, and may include a list of free slots of each of those buffers. Then, instead of simply reserving particular slots, reservation requests will be directed towards a selected one of the free buffers and one of the free slots of those buffers. Upon successful reservation of a free buffer, no other server will be able to write to or reserve that buffer until such the buffer is again marked as free in the control data of the server hosting that buffer and control data Similarly, in various implementations, particular buffers hosted by a server are dedicated for sole use by particular requesting servers without needing to first reserve those buffers. In other words, for any connection between any host server and any client server, the host may maintain a single buffer that is dedicated solely to that client. For example, if a particular host server is intended to connect with three client servers, that host server would maintain three separate RDMA message buffers, one for each client server.

This per-client buffer feature enables the RDMA-Based RPC Request System to make several assumptions regarding the control data that enable further network performance improvements. For example, because only one sender is writing a particular buffer of the receiver, the sender can keep track of all of the free slots of its assigned buffer without first requesting free slot control data. Further, the sender will know the number of concurrent messages being sent (e.g., number of active requests) so it can avoid overflowing its assigned RDMA message buffer without requesting control data that includes the total number of RPC requests active on the receiver. In addition, in various implementations, the sender can 'batch' collect the free message slot information because if it didn't fill up a slot then it knows that the slot is still free without requesting free slot control data. Advantageously, the use of multiple buffers for this purpose have been observed to provide further increases in network performance with additional reductions in overall latency.

2.5 RDMA Message Buffer and RPC Queue:

For purposes of explanation, the following discussion refers to the use of a circular buffer for instantiating the RDMA message buffer. However, there is no requirement for the RDMA-Based RPC Request System to use a circular buffer for this purpose. Any desired buffer type or size may be used with any number and size of slots without departing from the intended scope of the RDMA-Based RPC Request System described herein. If other buffer types are used, buffer access methods for the RDMA message buffer will differ slightly from the methods described for accessing the circular buffer.

In general, the RPC request written to the reserved slot in the RDMA buffer via the RDMA write message from the sender to the receiver may include the ID of any of a number of different processes in combination with one or more optional process parameters. Further, in various implementations, the RDMA write message used to transmit the RPC request may also include a cookie or the like in addition to the process ID and process parameters. In various implementations, a "cookie" or the like may also be sent along with the ID. In general, this cookie is an identifier (e.g., number, name, etc.) that uniquely identifies the sender in a way that enables the original message sent by the sender to be matched to the response that is eventually received by the sender.

In various implementations, one or more threads associated with one or more processes or applications are active on the receiver to monitor or listen to the RDMA message buffer of the receiver for RPC requests having IDs that are relevant to one of those threads. Whenever any particular thread locates a relevant RPC request in the RDMA message buffer, that thread pulls the relevant RPC request from the RDMA message buffer and writes it to an RPC queue in receiver memory for execution by the receiver.

As noted above, any number of processes running on any servers (acting as senders) in the network may be actively writing different RPC requests to free slots of the RDMA message buffer. Consequently, multiple RPC requests are typically active on any of the servers at any point in time. In various implementations, the RPC queue is instantiated as a FIFO buffer or queue so that RPC requests are served by the receiver in the order that those RPC requests were pulled from the RDMA message buffer and placed into the RPC queue by one of the active threads.

However, in various implementations, other servicing orders are enabled. For example, priorities may be associated with particular RPC requests in the RPC queue. In cases where particular RPC requests have higher priority than already buffered RPC requests, the higher priority requests may be executed first. Similarly, some senders may have a higher priority than other senders. In this case, RPC requests in the RPC queue from senders having higher priority may be executed by the receiver prior to RPC requests in the RPC queue from senders having lower priority. Similarly, certain RPC requests may include execution deadlines as a parameter. In this case, RPC requests may be sorted in order of execution deadline, with those having the soonest deadlines being executed before those with later deadlines in the RPC queue.

Regardless of whether any priority or deadline is associated with any RPC request or sender, once the receiver has executed the RPC request, the results of that request are returned to the RDMA message buffer of the sender via an RDMA write message, as discussed above. Further, as with the receiver, one or more threads associated with one or more processes or applications are active on the sender to monitor or listen to the RDMA message buffer of the sender for received RPC responses (or requests) that are relevant to one of those threads. Typically, but not necessarily, the thread of the sender that issued the original RPC request may also monitor the RDMA message buffer for the response to that request. When the thread identifies that response, it pulls the response from the RDMA message buffer and provides it, via the RDMA-based messaging API to the appropriate application or process.

In various implementations, whenever an RPC request or RPC response is pulled from the RDMA message buffer of either the sender or the receiver, the corresponding buffer slot is then marked as free in the control data of the corresponding sender or receiver. In various implementations, the free slot list (and other information such as number of active RPC requests) of the control data of each server is updated whenever there is a change in status of the slots. Continuous updates of the control data of each server enables the aforementioned lock-free and thread-safe communications capabilities of the RDMA-Based RPC Request System.

Figure 4:
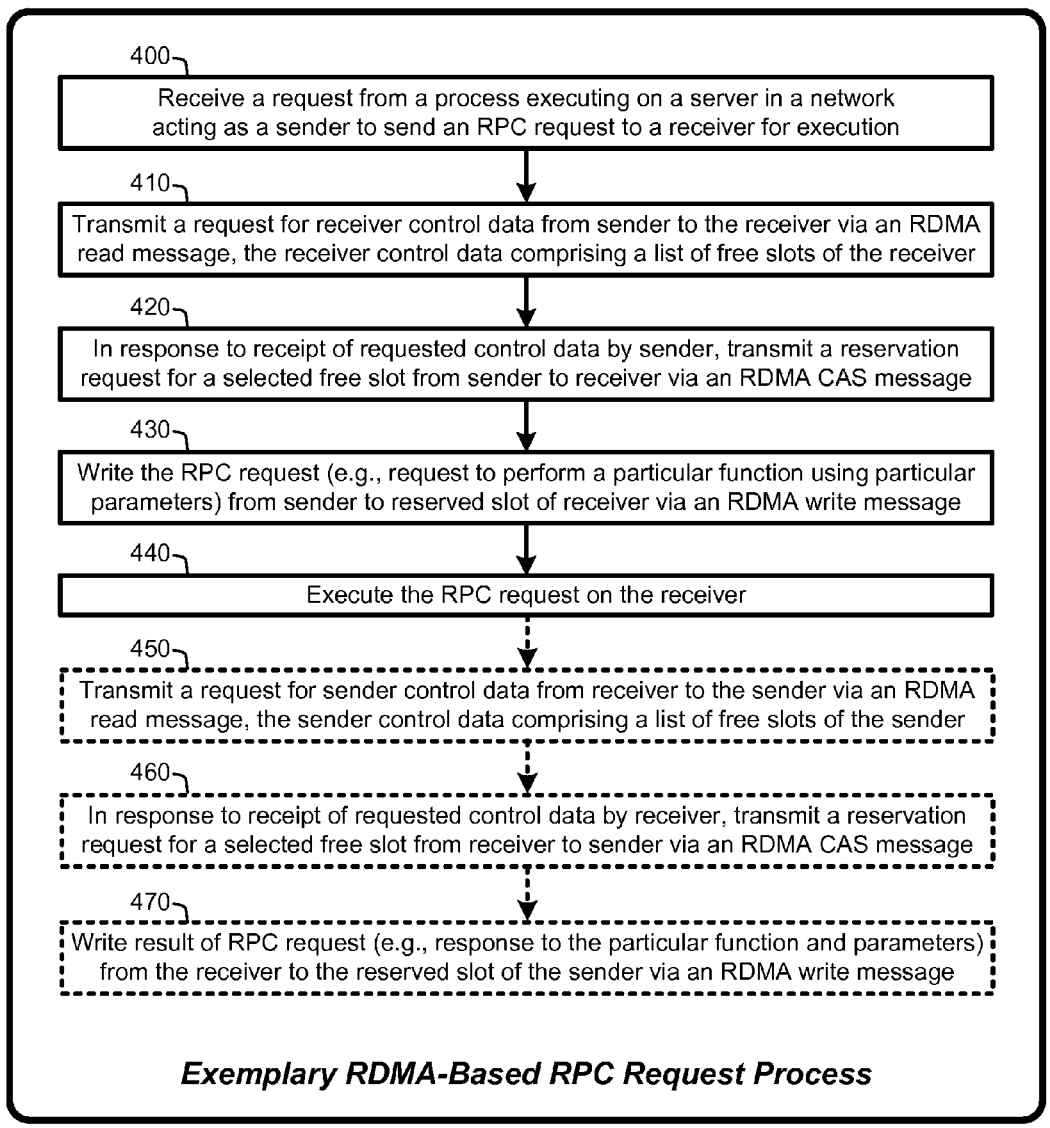
FIG. 4 illustrates a general system flow diagram that illustrates exemplary methods for effecting various implementations of the RDMA-Based RPC Request System, as described herein.

3.0 Operational Summary of the RDMA-Based RPC Request System:

The processes described above with respect to FIG. 1 through FIG. 3, and in further view of the detailed description provided above in Sections 1 and 2, are illustrated by the general operational flow diagram of FIG. 4. In particular, FIG. 4 provides an exemplary operational flow diagram that summarizes the operation of some of the various implementations of the RDMA-Based RPC Request System. FIG. 4 is not intended to be an exhaustive representation of all of the various implementations of the RDMA-Based RPC Request System described herein, and that the implementations represented in FIG. 4 are provided only for purposes of explanation.

Further, any boxes and interconnections between boxes that may be represented by broken or dashed lines in FIG. 4 represent optional or alternate implementations of the RDMA-Based RPC Request System described herein, and that any or all of these optional or alternate implementations, as described below, may be used in combination with other alternate implementations that are described throughout this document.

In general, as illustrated by FIG. 4, in various implementations, the RDMA-Based RPC Request System begins operation by receiving (400) a request from a process executing on a sender to send an RPC request to a receiver for execution. The RDMA-Based RPC Request System then transmits (410) a request for receiver control data from the sender to the receiver via an RDMA read message transmitted between the NICs of the sender and the receiver. As noted above, the receiver control data includes at least a list of free slots of the receiver.

Then, in response to receipt of the requested control data by the sender, the RDMA-Based RPC Request System transmits (420) a reservation request for one of the free slots from the sender to the receiver via an RDMA atomic compare and swap message transmitted between the NICs of the sender and the receiver. Following a successful reservation request, the sender writes (430) the RPC request (i.e., a request to perform a particular function using particular parameters) to the reserved slot of the receiver via an RDMA write message transmitted between the NICs of the sender and the receiver.

The receiver then executes (440) the RPC request. Following this execution, the receiver transmits (450) a request for sender control data to the sender via an RDMA read message transmitted between the NICs of the receiver and sender. As noted above, the sender control data includes at least a list of free slots of the sender.

Then, in response to receipt of the requested control data by the receiver, the receiver transmits (460) a reservation request for one of the free slots to the sender via an RDMA atomic compare and swap message between the NICs of the receiver and the sender. Following a successful reservation request, the receiver writes (470) the result of the RPC request (i.e., the response to the particular function using the particular parameters) to the reserved slot of the sender via an RDMA write message transmitted between the NICs of the receiver and the sender.

4.0 Exemplary Implementations for RDMA-Based RPC Messaging:

The following paragraphs summarize various examples of implementations that may be claimed in the present document. The implementations summarized below are not intended to limit the subject matter that may be claimed in view of the detailed description of the RDMA-Based RPC Request System. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, the RDMA-Based RPC Request System is implemented by means, processes or techniques for enabling fast RPC requests via a sequence of RDMA messages transmitted using commodity NICs between networked computers in a data center or other network environment. The process by which these RDMA messages are transmitted allows the overall RDMA-Based RPC Request System to be both lock-free and thread-safe. Advantageously, being both lock-free and thread-safe improves overall performance of RPC requests and memory access between networked computers by reducing overall system latency for transmission and execution of RPC requests over commodity NIC hardware. Further, the ability of the messaging techniques described herein to use commodity NICs reduces networking costs relative to networks based on specialized NIC hardware. In addition, networks implemented using the RDMA-Based RPC Request System are very flexible in that any server acting as a sender with respect to one or more other receivers may concurrently be acting as a receiver with respect to one or more other senders. Further, the RDMA-Based RPC Request System is easily scalable to multiple simultaneous, concurrent, or sequential requests from servers acting in either or both a sender and a receiver capacity, thereby improving network performance.

As a first example, in various implementations, a computer-implemented process is implemented via means, processes or techniques for receiving a request from a process executing on a sender to send an RPC request to a receiver for execution. In various implementations, the computer-implemented process then transmits a request for receiver control data from the sender to the receiver via an RDMA read message, the receiver control data comprising a list of free slots of the receiver. Next, in response to receipt of the requested control data by the sender, transmitting a reservation request for one of the free slots from the sender to the receiver via an RDMA atomic compare and swap message. In various implementations, the computer-implemented process then writes the RPC request from the sender to the reserved slot of the receiver via an RDMA write message. In various implementations, the RPC request is then executed on the receiver.

As a second example, in various implementations, the first example is further modified via means, processes or techniques for transmitting a request for sender control data from the receiver to the sender via an RDMA read message, the sender control data comprising a list of free slots of the sender. Further, in response to receipt of the requested control data by the receiver, a reservation request for one of the free slots is transmitted from the receiver to the sender via an RDMA atomic compare and swap message. Finally, the result of the RPC request from the receiver is written to the reserved slot of the sender via an RDMA write message.

As a third example, in various implementations, the second example is further modified via means, processes or techniques for including a total number of RPC requests active on the receiver in the receiver control data, and a total number of RPC requests active on the sender in the sender control data.

As a fourth example, in various implementations, any of the first example, the second example, and the third example are further modified via means, processes or techniques for transmitting all of the RDMA messages between RDMA-enabled NICs of the sender and the receiver without any interruption or notification to the CPU of either the sender or the receiver.

As a fifth example, in various implementations, any of the first example, the second example, the third example, and the fourth example are further modified via means, processes or techniques for hosting of the control data of the sender by the sender and hosting of the control data of the receiver by the receiver.

As a sixth example, in various implementations, any of the first example, the second example, the third example, the fourth example, and the fifth example are further modified via means, processes or techniques for hosting an RDMA message buffer in main memory of the receiver, and wherein the list of free slots in the receiver control data represents corresponding free slots of the RDMA message buffer of the receiver.

As a seventh example, in various implementations, the sixth example is further modified via means, processes or techniques for applying an RPC request monitor of the receiver that is configured to apply one or more threads to monitor the RDMA message buffer of the receiver for relevant RPC requests and pull relevant RPC requests from the RDMA message buffer and add the pulled RPC requests to an RPC queue of the receiver.

As an eighth example, in various implementations, the seventh example is further modified via means, processes or techniques for applying an RPC request monitor of the receiver that is configured to apply an RPC request processing module that is configured to apply one or more threads to monitor RPC queue for relevant RPC requests and to call procedures identified by relevant RPC requests for use in executing the RPC request on the receiver.

As a ninth example, in various implementations, a system is implemented via means, processes or techniques for providing a plurality of networked servers in communication via RDMA-enabled NICs, each networked server acting as either a sender or a receiver with respect to one or more of the other networked servers. An RDMA-based messaging API is hosted on each server. In various implementations, the API of one of the servers acting as a sender is applied to intercept an RPC request initiated by the sender. The API of the sender is then applied to direct a NIC of sender to transmit an RDMA read message to a NIC of one of the servers acting as a receiver, the RDMA read message configured to request control data comprising a list of free slots of an RDMA message buffer hosted on the receiver. In various implementations, the API of the sender is then applied to direct the NIC of sender to transmit an RDMA CAS message to the NIC of the receiver, the RDMA CAS message configured to reserve a selected one of the free slots of the RDMA message buffer of the receiver. In various implementations, the API of the sender is then applied to direct the NIC of sender to transmit an RDMA write message to the NIC of the receiver, the RDMA write message configured to write the RPC request to the reserved slot of the RDMA message buffer. Finally, in various implementations, the API of the receiver is applied to execute the RPC request on the receiver.

As a tenth example, in various implementations, the ninth example is further modified via means, processes or techniques for applying the API of the receiver to direct the NIC of receiver to transmit an RDMA read message to a NIC of the sender, the RDMA read message configured to request control data comprising a list of free slots of an RDMA message buffer hosted on the sender. The API of the receiver is then applied to direct the NIC of receiver to transmit an RDMA CAS message to the NIC of the sender, the RDMA CAS message configured to reserve a selected one the free slots of the RDMA message buffer of the sender. The API of the receiver is then applied to direct the NIC of receiver to transmit an RDMA write message to the NIC of the sender, the RDMA write message configured to write results of the executed RPC request to the reserved slot of the RDMA message buffer of the sender.

As an eleventh example, in various implementations, any of the ninth example and the tenth example are further modified via means, processes or techniques for providing a total number of RPC requests active on the receiver in the receiver control data.

As a twelfth example, in various implementations, any of the ninth example, the tenth example, and the eleventh example are further modified via means, processes or techniques for providing a total number of RPC requests active on the sender in the sender control data.

As a thirteenth example, in various implementations, any of the ninth example, the tenth example, the eleventh example, and the twelfth example are further modified via means, processes or techniques for applying an RPC request monitor of the receiver configured to apply one or more threads to monitor the RDMA message buffer of the receiver for relevant RPC requests, and to pull relevant RPC requests from the RDMA message buffer and add the pulled RPC requests to an RPC queue of the receiver.

As a fourteenth example, in various implementations, the thirteenth example is further modified via means, processes or techniques for executing the RPC request on the receiver by applying an RPC request processing module that is configured to apply one or more threads to monitor RPC queue for relevant RPC requests, and to call procedures identified by relevant RPC requests.

As a fifteenth example, in various implementations, a method is implemented via means, processes or techniques for providing receiving a request from a process executing on a sender to transmit an RPC request to a receiver for execution. In various implementations, this method then transmits a reservation request from a NIC of the sender to a NIC of the receiver to reserve a particular free slot of an RDMA message buffer hosted on the receiver via an RDMA CAS message. In various implementations, this method then transmits the RPC request from the NIC of the sender to the reserved slot of the RDMA message buffer via an RDMA write message to the NIC of the receiver. In various implementations, this method then applies a thread executing on the receiver to pull the RPC request from the RDMA message buffer and pass that RPC request to be executed on the receiver.

As a sixteenth example, in various implementations, the fifteenth example is further modified via means, processes or techniques for transmitting a reservation request from a NIC of the receiver to a NIC of the sender to reserve a particular free slot of an RDMA message buffer hosted on the sender via an RDMA CAS message, and transmitting results of the executed RPC request from the NIC of the receiver to the reserved slot of the RDMA message buffer of the sender via an RDMA write message to the NIC of the sender.

As a seventeenth example, in various implementations, any of the fifteenth example and the sixteenth example are further modified via means, processes or techniques for identifying free slots of the RDMA message buffer hosted on the receiver by applying the NIC of the sender to transmit an RDMA read message to the NIC of the receiver, the RDMA read message configured to request control data comprising a list of free slots of the RDMA message buffer hosted on the receiver.

As an eighteenth example, in various implementations, the sixteenth example is further modified via means, processes or techniques for identifying free slots of the RDMA message buffer hosted on the sender by applying the NIC of the receiver to transmit an RDMA read message to the NIC of the sender, the RDMA read message configured to request control data comprising a list of free slots of the RDMA message buffer hosted on the sender.

As a nineteenth example, in various implementations, any of the fifteenth example, the sixteenth example, the seventeenth example, and the eighteenth example are further modified via means, processes or techniques for applying the thread to add the pulled RPC request to an RPC queue prior to execution of the RPC request.

As a twentieth example, in various implementations, the nineteenth example is further modified via means, processes or techniques for including a plurality of pending RPC requests in the RPC queue servicing the plurality of pending RPC requests from the RPC queue on a FIFO basis.

Figure 5:
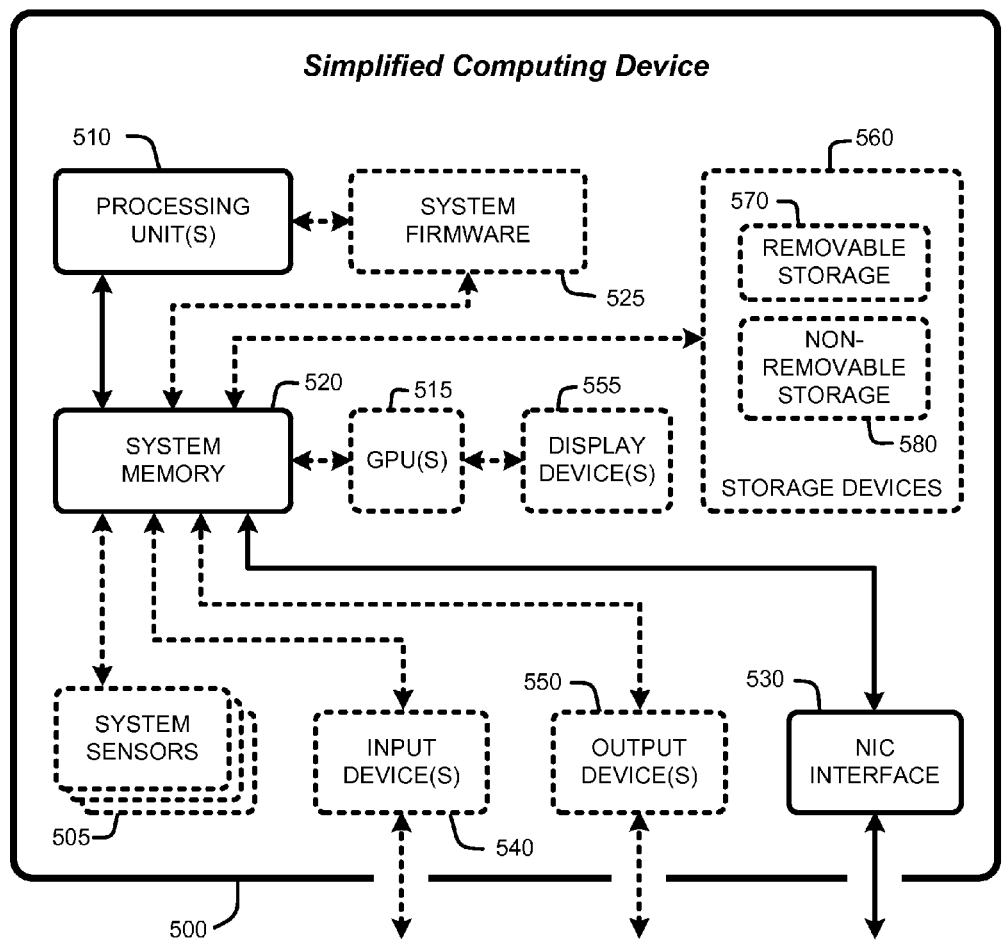
FIG. 5 is a general system diagram depicting a simplified general-purpose computing device having simplified computing and I/O capabilities for use in effecting various implementations of the RDMA-Based RPC Request System, as described herein.

5.0 Exemplary Operating Environments:

The RDMA-Based RPC Request System implementations described herein are operational within numerous types of general purpose or special purpose computing system environments or configurations. FIG. 5 illustrates a simplified example of a general-purpose computer system on which various implementations and elements of the RDMA-Based RPC Request System, as described herein, may be implemented. Any boxes that are represented by broken or dashed lines in the simplified computing device 500 shown in FIG. 5 represent alternate implementations of the simplified computing device. As described below, any or all of these alternate implementations may be used in combination with other alternate implementations that are described throughout this document.

The simplified computing device 500 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the RDMA-Based RPC Request System implementations described herein, the device should have a sufficient computational capability and system memory to enable basic computational operations. In particular, the computational capability of the simplified computing device 500 shown in FIG. 5 is generally illustrated by one or more processing unit(s) 510, and may also include one or more graphics processing units (GPUs) 515, either or both in communication with system memory 520. The processing unit(s) 510 of the simplified computing device 500 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 500 may also include other components, such as, for example, a network interface controller 530. The simplified computing device 500 may also include one or more conventional computer input devices 540 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 500 and with any other component or feature of the RDMA-Based RPC Request System, including input, output, control, feedback, and response to one or more users or other devices or systems associated with the RDMA-Based RPC Request System, are enabled by a variety of Natural User Interface (NUI) scenarios. The NUI techniques and scenarios enabled by the RDMA-Based RPC Request System include, but are not limited to, interface technologies that allow one or more users user to interact with the RDMA-Based RPC Request System in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 540 or system sensors 505. Such NUI implementations are also enabled by the use of various techniques including, but not limited to, information derived from system sensors 505 or other input devices 540 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the RDMA-Based RPC Request System.

However, the aforementioned exemplary NUI scenarios may be further augmented by combining the use of artificial constraints or additional signals with any combination of NUI inputs. Such artificial constraints or additional signals may be imposed or generated by input devices 540 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the RDMA-Based RPC Request System.

The simplified computing device 500 may also include other optional components such as one or more conventional computer output devices 550 (e.g., display device(s) 555, audio output devices, video output devices, devices for transmitting wired or wireless data transmissions, and the like). Typical network interface controllers (NICs) 530, input devices 540, output devices 550, and storage devices 560 for general-purpose computers are well known to those skilled in the art, and will not be described in detail herein.

The simplified computing device 500 shown in FIG. 5 may also include a variety of computer-readable media. Computer-readable media can be any available media that can be accessed by the computing device 500 via storage devices 560, and include both volatile and nonvolatile media that is either removable 570 and/or non-removable 580, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various RDMA-Based RPC Request System implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 525, hardware, or any combination thereof to control a computer to implement the disclosed subject matter. The term "article of manufacture" as used herein is intended to encompass a computer program accessible from any computer-readable device, or media.

The RDMA-Based RPC Request System implementations described herein may be further described in the general context of computer-executable instructions, such as program modules, being executed by a computing device. Generally, program modules include routines, programs, objects, components, data structures, and the like, that perform particular tasks or implement particular abstract data types. The RDMA-Based RPC Request System implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the RDMA-Based RPC Request System has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the RDMA-Based RPC Request System. It is intended that the scope of the RDMA-Based RPC Request System be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the RDMA-Based RPC Request System described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A computer-implemented process, comprising:
   receiving a request from a process executing on a sender to send an RPC request to a receiver for execution;
   transmitting a request for receiver control data from the sender to the receiver via an RDMA read message, the receiver control data comprising a list of free slots of the receiver;
   in response to receipt of the requested control data by the sender, transmitting a reservation request for one of the free slots from the sender to the receiver via an RDMA atomic compare and swap message;
   writing the RPC request from the sender to the reserved slot of the receiver via an RDMA write message; and
   executing the RPC request on the receiver.

2. The computer-implemented process of claim 1 further comprising:
   transmitting a request for sender control data from the receiver to the sender via an RDMA read message, the sender control data comprising a list of free slots of the sender;
   in response to receipt of the requested control data by the receiver, transmitting a reservation request for one of the free slots from the receiver to the sender via an RDMA atomic compare and swap message; and
   writing the result of the RPC request from the receiver to the reserved slot of the sender via an RDMA write message.

3. The computer-implemented process of claim 2 wherein:
   the receiver control data further comprises a total number of RPC requests active on the receiver; and
   the sender control data further comprises a total number of RPC requests active on the sender.

4. The computer-implemented process of claim 1 wherein all of the RDMA messages are transmitted between RDMA-enabled NICs of the sender and the receiver without any interruption or notification to the CPU of either the sender or the receiver.

5. The computer-implemented process of claim 1 wherein the control data of the sender is hosted on by the sender and the control data of the receiver is hosted by the receiver.

6. The computer-implemented process of claim 1 further comprising:
   an RDMA message buffer hosted in main memory of the receiver; and
   wherein the list of free slots in the receiver control data represents corresponding free slots of the RDMA message buffer of the receiver.

7. The computer-implemented process of claim 6 further comprising an RPC request monitor of the receiver configured to:
   apply one or more threads to monitor the RDMA message buffer of the receiver for relevant RPC requests;
   pull relevant RPC requests from the RDMA message buffer and add the pulled RPC requests to an RPC queue of the receiver.

8. The computer-implemented process of claim 7 wherein executing the RPC request on the receiver further comprises applying an RPC request processing module configured to:
   apply one or more threads to monitor RPC queue for relevant RPC requests; and
   call procedures identified by relevant RPC requests.

9. A system, comprising:
   a plurality of networked servers in communication via RDMA-enabled NICs, each networked server acting as either a sender or a receiver with respect to one or more of the other networked servers;
   an RDMA-based messaging API hosted on each server;
   applying the API of one of the servers acting as a sender to intercept an RPC request initiated by the sender;
   applying the API of the sender to direct a NIC of sender to transmit an RDMA read message to a NIC of one of the servers acting as a receiver, the RDMA read message configured to request control data comprising a list of free slots of an RDMA message buffer hosted on the receiver;
   applying the API of the sender to direct the NIC of sender to transmit an RDMA CAS message to the NIC of the receiver, the RDMA CAS message configured to reserve a selected one of the free slots of the RDMA message buffer of the receiver;
   applying the API of the sender to direct the NIC of sender to transmit an RDMA write message to the NIC of the receiver, the RDMA write message configured to write the RPC request to the reserved slot of the RDMA message buffer; and
   applying the API of the receiver to execute the RPC request on the receiver.

10. The system of claim 9 further comprising:
    applying the API of the receiver to direct the NIC of receiver to transmit an RDMA read message to a NIC of the sender, the RDMA read message configured to request control data comprising a list of free slots of an RDMA message buffer hosted on the sender;
    applying the API of the receiver to direct the NIC of receiver to transmit an RDMA CAS message to the NIC of the sender, the RDMA CAS message configured to reserve a selected one the free slots of the RDMA message buffer of the sender; and
    applying the API of the receiver to direct the NIC of receiver to transmit an RDMA write message to the NIC of the sender, the RDMA write message configured to write results of the executed RPC request to the reserved slot of the RDMA message buffer of the sender.

11. The system of claim 10 wherein the sender control data further comprises a total number of RPC requests active on the sender.

12. The system of claim 9 wherein the receiver control data further comprises a total number of RPC requests active on the receiver.

13. The system of claim 9 further comprising an RPC request monitor of the receiver configured to:
    apply one or more threads to monitor the RDMA message buffer of the receiver for relevant RPC requests;
    pull relevant RPC requests from the RDMA message buffer and add the pulled RPC requests to an RPC queue of the receiver.

14. The system of claim 13 wherein executing the RPC request on the receiver further comprises applying an RPC request processing module configured to:
    apply one or more threads to monitor RPC queue for relevant RPC requests; and
    call procedures identified by relevant RPC requests.

15. A computer-readable storage device having computer executable instructions stored therein, said instructions causing a computing device to execute a method comprising:
  receiving a request from a process executing on a sender to transmit an RPC request to a receiver for execution;
  transmitting a reservation request from a NIC of the sender to a NIC of the receiver to reserve a particular free slot of an RDMA message buffer hosted on the receiver via an RDMA CAS message;
  transmitting the RPC request from the NIC of the sender to the reserved slot of the RDMA message buffer via an RDMA write message to the NIC of the receiver; and
  applying a thread executing on the receiver to pull the RPC request from the RDMA message buffer and pass that RPC request to be executed on the receiver.

16. The computer-readable storage device of claim 15 further comprising instructions for:
  transmitting a reservation request from a NIC of the receiver to a NIC of the sender to reserve a particular free slot of an RDMA message buffer hosted on the sender via an RDMA CAS message; and
  transmitting results of the executed RPC request from the NIC of the receiver to the reserved slot of the RDMA message buffer of the sender via an RDMA write message to the NIC of the sender.

17. The computer-readable storage device of claim 16 further comprising instructions for identifying free slots of the RDMA message buffer hosted on the sender by applying the NIC of the receiver to transmit an RDMA read message to the NIC of the sender, the RDMA read message configured to request control data comprising a list of free slots of the RDMA message buffer hosted on the sender.

18. The computer-readable storage device of claim 15 further comprising instructions for identifying free slots of the RDMA message buffer hosted on the receiver by applying the NIC of the sender to transmit an RDMA read message to the NIC of the receiver, the RDMA read message configured to request control data comprising a list of free slots of the RDMA message buffer hosted on the receiver.

19. The computer-readable storage device of claim 15 wherein the thread adds the pulled RPC request to an RPC queue prior to execution of the RPC request.

20. The computer-readable storage device of claim 19 wherein the RPC queue includes a plurality of pending RPC requests and wherein the plurality of pending RPC requests are serviced from the RPC queue on a FIFO basis.

* * * * *